United States Patent
Yamada

(10) Patent No.: US 6,510,253 B1
(45) Date of Patent: Jan. 21, 2003

(54) IMAGE INFORMATION NETWORK

(75) Inventor: Masahiko Yamada, Kanagawa-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/255,719

(22) Filed: Feb. 23, 1999

(30) Foreign Application Priority Data

Feb. 23, 1998 (JP) .......................................... 10-040272

(51) Int. Cl.$^7$ .............................. G06K 9/32; G06K 9/62; H04N 1/46
(52) U.S. Cl. ...................... 382/300; 382/299; 382/298; 382/209; 358/525; 707/516; 707/6
(58) Field of Search ................................ 382/298, 293, 382/300, 291, 209, 131, 132, 305, 307; 358/525, 528; 708/290, 847

(56) References Cited

U.S. PATENT DOCUMENTS

| | | | | |
|---|---|---|---|---|
| 4,748,511 A | * | 5/1988 | Nichols | 358/111 |
| 5,048,105 A | * | 9/1991 | Adachi | 382/47 |
| 5,148,499 A | * | 9/1992 | Matsumura | 382/284 |
| 5,301,266 A | * | 4/1994 | Kimura | 395/139 |
| 5,420,637 A | * | 5/1995 | Zeevi et al. | 348/409 |
| 5,883,985 A | * | 3/1999 | Pourjavid | 382/274 |
| 5,901,254 A | * | 5/1999 | Iguchi et al. | 382/298 |
| 6,034,786 A | * | 3/2000 | Kwon | 358/1.2 |

* cited by examiner

Primary Examiner—Leo Boudreau
Assistant Examiner—Yosef Kassa
(74) Attorney, Agent, or Firm—Sughrue Mion, PLLC

(57) ABSTRACT

Using an image processing apparatus for carrying out general interpolation processing which can freely adjust a frequency response characteristic regardless of an enlargement or reduction ratio, an image whose frequency response characteristic almost agrees visually with the frequency response characteristic of an optimal diagnostic image obtained by interpolation processing of another kind can be easily obtained. The image processing apparatus comprises conversion means for converting the characteristic of interpolation processing by first enlargement or reduction processing means to a characteristic corresponding to that of interpolation processing by second enlargement or reduction processing means so that a visible image reproduced by a network printer almost agrees visually with a visible image reproduced by a CR printer, in terms of the enlargement or reduction ratio and the response characteristic.

13 Claims, 4 Drawing Sheets

IMAGE INFORMATION NETWORK

BACKGROUND OF THE INVENTION

1. Filed of the Invention

The present invention relates to an image information network, and more specifically to an image information network wherein a visual characteristic of an image output by an image reproducing apparatus is improved.

2. Description of the Related Art

Recently, radiation image reading recording systems (Computed Radiography systems or CR systems) have been widely spread and put into practice. Stimulable phosphor, which emits light upon exposure to stimulating rays such as visible light or a laser beam in accordance with radiation energy originated in a radioactive ray having been irradiated on the material and stored therein, is used for a CR system. A CR system temporarily records radiation image information regarding a subject such as a human body on a stimulable phosphor sheet, and scans the stimulable phosphor sheet using a stimulating ray such as a laser beam to cause the sheet to emit light. The emitted light is read photoelectrically as an electric signal and the CR system obtains this image signal. After carrying out predetermined image processing on the image signal, the CR system outputs a visible image.

The CR system includes a display apparatus for displaying the resultant visible image, a laser printer (LP) for outputting the image on a film, and the like. In order to cause the resultant visible image to become optimal for diagnosis, predetermined image processing such as frequency enhancing processing, tone processing, enlargement or reduction processing accompanied by interpolation processing (hereinafter simply called "interpolation processing"), and the like is generally carried out on the image signal before the output thereof.

In a CR system, the enlargement or reduction processing to which the interpolation processing is applied is pre-set so that a predetermined response characteristic can be obtained in accordance with a reading density, an image size, an enlargement or reduction ratio, and the like. As the interpolation processing applied to the enlargement or reduction processing, interpolation methods which find a value of one signal based on values of 2 signals (for example, linear interpolation), or based on values of 3 signals (for example, secondary Lagrange interpolation), or based on values of 4 signals (for example, a cubic spline interpolation operation; see U.S. Ser. No. 08/679,830 by the assignee) are used. Based on a characteristic of an image signal and accumulated experience in the past, the enlargement or reduction processing is set in order to obtain a visible image which is optimal for diagnosis by a simple operation.

In the field of medicine, not only the CR systems but also various kinds of medical image generating systems using X rays or the like are used. For example, CT (Computed Tomography) systems, MRI (Magnetic Resonance Imaging) Systems, and the like have been put into practice. In an image generated by each of these systems (modalities), characters showing the photographed portion and the name of a patient are included together with the subject. Therefore, it is appropriate for each of these systems to carry out enlargement or reduction processing (see U.S. Ser. No. 08/829,471 by the applicant; hereinafter called "A-VRS interpolation processing") adopting interpolation processing wherein interpolation operations change sharpness continuously, ranging from high (the cubic spline interpolation operation and the like) to low (for example, a B spline interpolation operation).

Therefore, even in the case where the same image information is reproduced, an image reproduced through interpolation processing thereon by the CR system and an image reproduced through interpolation processing thereon by the A-VRS interpolation processing are visually different in terms of a frequency response characteristic.

Following the recent development and advancement of techniques in communications and computers, image information networks using computers have been constructed in hospitals, and each of the above systems, such as CR, CT, MRI systems or the like, which has been used in a stand alone mode is becoming a portion of the image information network. A network printer, which is a general purpose image reproducing apparatus and outputs images of the various apparatuses in the above, is connected to such an image information network. Furthermore, an image processing apparatus which can carry out general interpolation processing is also connected. The A-VRS interpolation processing is appropriate for the general interpolation processing.

The interpolation processing according to the A-VRS interpolation method can freely adjust the frequency response characteristic of an image in accordance with the enlargement or reduction ratio. Therefore, this processing is convenient in an attempt to obtain an optimal image by changing the frequency response characteristic by trial and error. However, it is very time-consuming to find the optimal characteristic for each image, and an operator is forced to carry out troublesome adjustment operations. Especially, for image information obtained by a CR system which has established, for each enlargement or reduction ratio, a frequency response characteristic optimal for diagnosis, there are few merits of outputting the image by a network printer after such a time-consuming operation.

Furthermore, even when the same image information is used, an image reproduced by a CR system printer after interpolation processing thereon by the CR system and an image reproduced by a network printer after the A-VRS interpolation processing thereon have a visual characteristic (frequency response characteristic) difference, which is not preferable for diagnostic purposes.

SUMMARY OF THE INVENTION

Based on considerations of the above problems, an object of the present invention is to provide an image information network which can easily obtain an image whose frequency response characteristic almost agrees visually to the frequency response characteristic of an optimal diagnostic image obtained by interpolation of a kind other than the kind of interpolation processing on the former image, by using an image processing apparatus for carrying out general interpolation processing wherein the frequency response characteristic is freely adjustable regardless of an enlargement or reduction ratio.

In an image information network (such as a medical image information network according to the DICOM [Digital Imaging and Communications in Medicine] standard) which comprises first enlargement or reduction processing means for enlarging or reducing an image represented by image information input thereto, by carrying out first interpolation processing (general interpolation processing such as the A-VRS interpolation method) which converts the image information to an image having an arbitrary enlargement or reduction ratio and an arbitrary frequency response characteristic, a first image reproducing apparatus (a general purpose network printer, for example) for reproducing the image represented by the image information input thereto from the first enlargement or reduction processing means, second enlargement or reduction processing means for carrying out enlargement or reduction processing on an image represented by image information input thereto, by carrying out second interpolation processing (such as linear interpolation) which converts the image information into image information having an enlargement or reduction ratio (including a reading density, an image size, and the like) and a frequency response characteristic both of which are pre-set stepwise and different from a conversion characteristic of the first interpolation processing, and a second image reproducing apparatus (such as a printer attached to a CR system) for reproducing the image represented by the image information input thereto from the second enlargement or reduction processing means, the image information network of the present invention is characterized by that it further comprises:

conversion means for converting the characteristic of the first interpolation processing to a characteristic corresponding to that of the second interpolation processing so that the image reproduced by the first image reproducing apparatus through the first interpolation processing almost agrees visually with the image reproduced by the second image reproducing apparatus through the second interpolation processing, in terms of the enlargement or reduction ratio and in the frequency response characteristic.

"The second interpolation processing which converts the image information into image information having an enlargement or reduction ratio and a frequency response characteristic both of which are pre-set stepwise" means a linear interpolation operation, secondary Lagrange interpolation, a cubic spline interpolation operation, and the like. The second interpolation processing is processing wherein the frequency response characteristic is explicitly determined for each combination of the enlargement or reduction ratio, the reading density, the image size, and the like. In the second interpolation processing, the combination of the enlargement or reduction ratio and the like is not continuously defined, but discretely defined, such as in 10 steps, for example.

The conversion means may be a table relating the characteristic of the first interpolation processing (or a parameter defining the characteristic) to that of the second interpolation processing (or a parameter defining the characteristic), or conversion means of a known kind.

The situation wherein the images visually agree in terms of the enlargement or reduction ratio and the frequency response characteristic means that the enlargement or reduction ratios need to agree approximately, but the frequency response characteristics do not need to agree in all frequency ranges. The frequency response characteristics have to agree approximately, at least in a frequency range lower than a Nyquist frequency upon sub-sampling in the enlargement or reduction processing.

According to the image information network of the present invention, the first enlargement or reduction processing means, which carries out the general interpolation processing wherein the frequency response characteristic is freely adjustable regardless of the enlargement or reduction ratio, can generate an image which visually agrees, in terms of the frequency response characteristic, with an optimal diagnostic image obtained by interpolation processing of a kind other than the kind of the first interpolation processing, by converting the characteristic of the first interpolation processing to a characteristic corresponding to that of the second interpolation processing so that the image reproduced by the first image reproducing means through the first interpolation processing visually agrees with the image reproduced by the second image reproducing means through the second interpolation processing in terms of the enlargement or reduction ratio and the frequency response characteristic.

Therefore, for image information obtained by a CR system or the like which has established, for each enlargement or reduction ratio, the frequency response characteristic that is optimal for diagnosis, an image whose quality is almost the same visually as the quality of an image by the CR system can be output easily by a general purpose network printer, without a time-consuming operation.

DESCRIPTION OF THE PREFERRED EMBODIMENT

Hereinafter, an embodiment of an image information network of the present invention will be explained in detail, with reference to the accompanying drawings.

Figure 1:
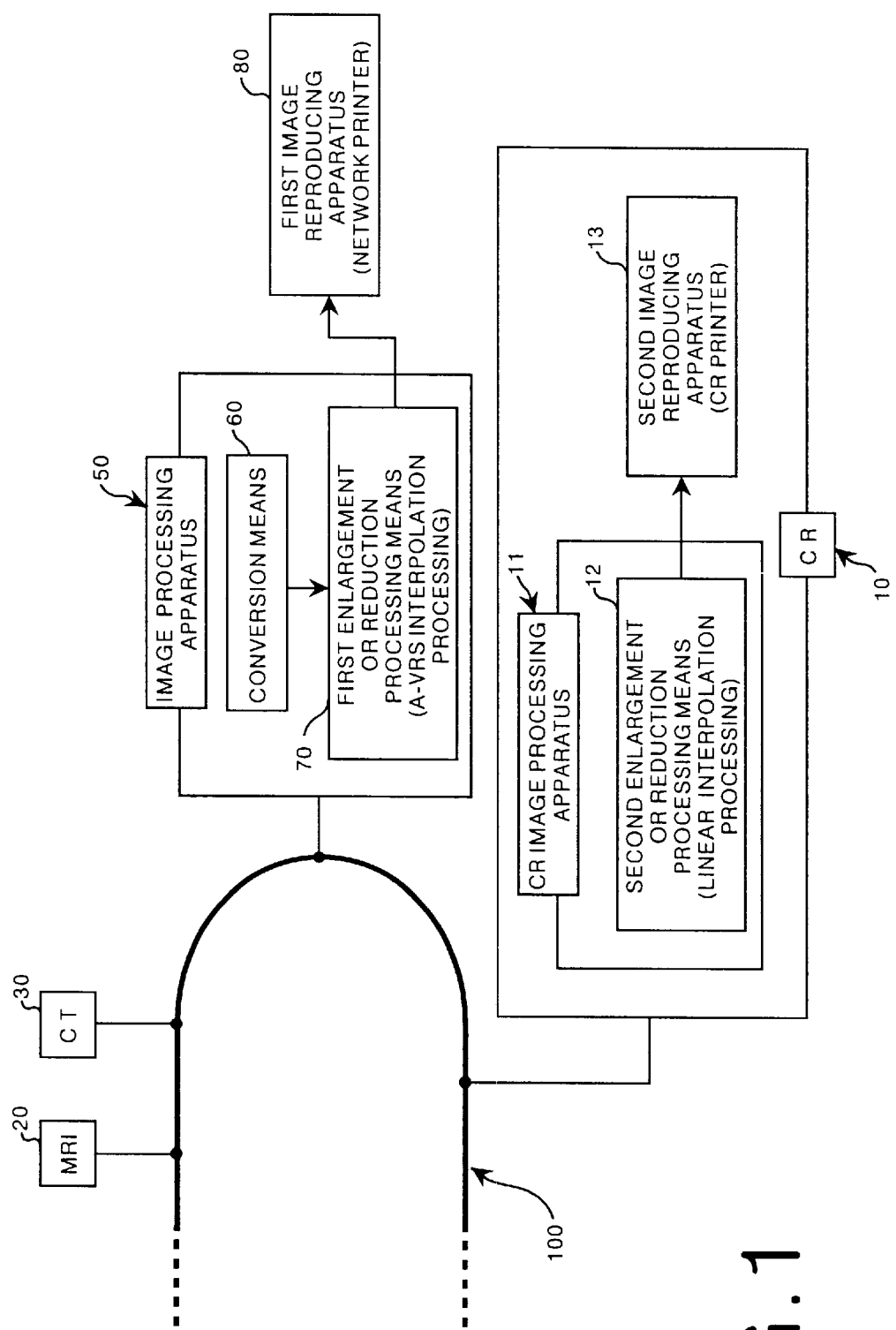
FIG. 1 is a diagram showing an embodiment of an image information network of the present invention.
Figure 2:
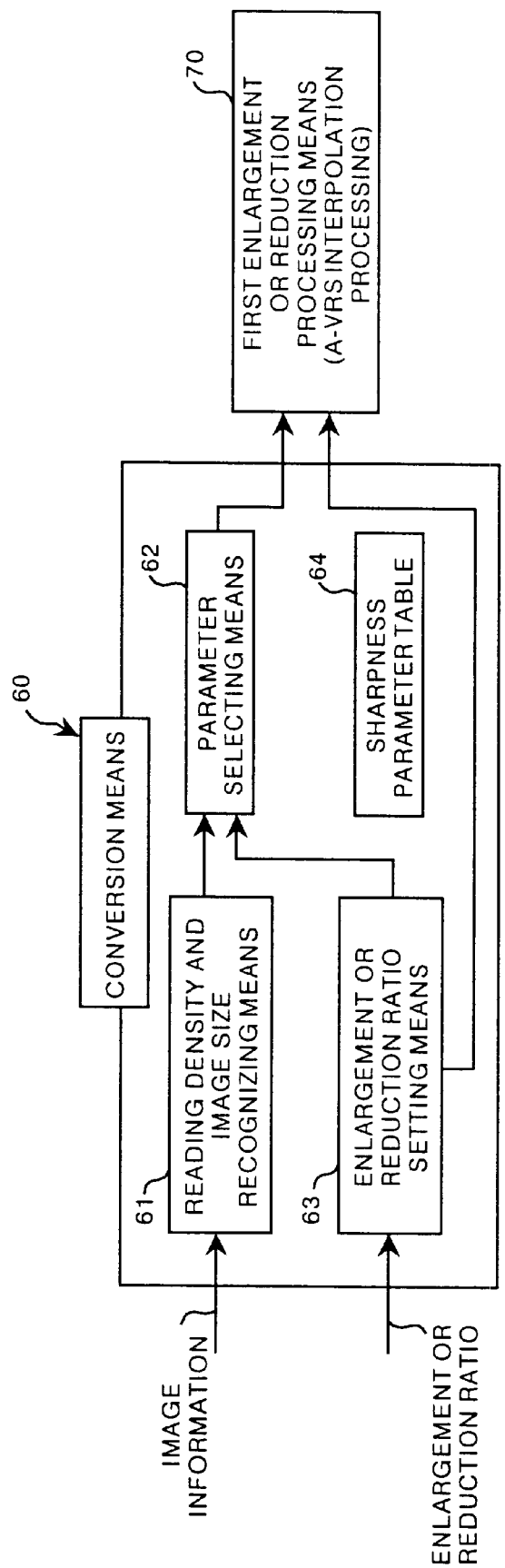
FIG. 2 is a diagram showing in detail conversion means in the image information network shown in FIG. 1.

FIG. 1 shows an embodiment of the image information network of the present invention, and FIG. 2 shows conversion means of the image information network in detail.

An image information network 100 shown in FIG. 1 is an image information network according to the DICOM standard dealing with image information for diagnosis in the field of medicine. Various kinds of medical image generating systems such as a so-called CR system 10, an MRI system 20, and a CT system 30 are connected to the network 100. Image information generated by each of these systems can be reproduced as a visible image by various kinds of terminals connected to the network 100.

As a terminal in this network, a network printer (a first image reproducing apparatus in FIG. 1) 80 which outputs a visible image on a film is connected. The printer 80 is a general purpose laser printer for outputting image information input through the network 100 and processed by using various kinds of image processing in an image processing apparatus 50 (which will be described later) as a visible image on a film.

Among the medical image generating systems connected to the network 100, the CR system 10 includes a CR image processing apparatus 11 which carries out various kinds of image processing on image information generated by the CR system in order to obtain a visible image which is optimal for diagnosis, and a laser printer 13 (a CR printer; shown as a second image reproducing apparatus in FIG. 1) which outputs on a film the visible image represented by the image information processed by the image processing apparatus 11.

Frequency enhancement processing, tone processing, enlargement or reduction processing accompanied by interpolation processing (hereinafter called "interpolation processing") are included in the image processing carried out by the CR image processing apparatus 11. The interpolation processing is carried out by second enlargement or reduction processing means 12.

The second enlargement or reduction processing means 12 carries out enlargement or reduction processing adopting a linear interpolation operation. A predetermined response characteristic (frequency response characteristic) is pre-set stepwise in accordance with each combination of density upon reading of image information by an image information reading apparatus (not shown) of the CR system 10, an image size, and an enlargement or reduction ratio specified by an operator. As the interpolation processing by the second enlargement or reduction processing means, not only the linear interpolation but also secondary Lagrange interpolation, a cubic spline, and the like can be used.

Figure 3A:
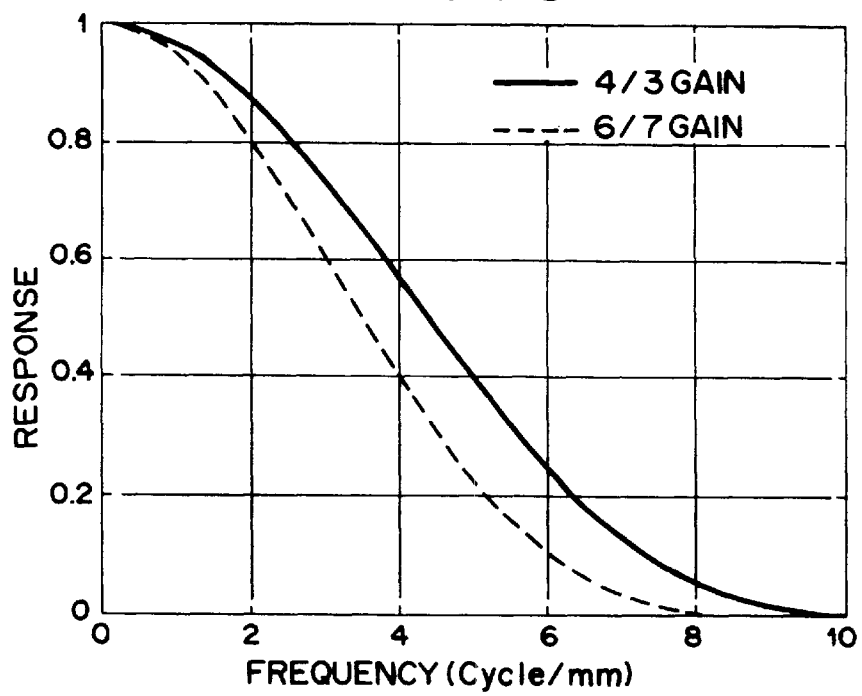
FIGS. 3A and 3B are diagrams showing response characteristics of images output from a CR printer and from a network printer respectively.

For example, FIG. 3A shows response characteristics for a combination of a reading density of 5 lines/mm, an image size of half sheet, and a gain of 4/3 (solid curve), and that for a combination of 10 lines/mm, 1/6 sheet, and 6/7 (dashed curve). As in the above, the response characteristic in the interpolation processing by the CRT system 10 is pre-set stepwise, in order to obtain a visible image which is optimal for diagnosis by an easy operation, based on a characteristic of image information acquired by the CR system 10 and on accumulated experience.

Therefore, a visible image output by the CR printer 13 is an image having the enlargement or reduction ratio and the frequency response characteristic having been pre-set stepwise.

Meanwhile, like the CR image processing apparatus 11, the image processing apparatus 50 connected to the network printer 80 carries out frequency enhancement processing, tone processing, enlargement or reduction processing accompanied by interpolation processing (hereinafter called "interpolation processing"), and the like on image information input thereto. Among these kinds of processing, the interpolation processing is carried out by first enlargement or reduction processing means 70.

Unlike the second enlargement or reduction processing means 12, the first enlargement or reduction processing means 70 carries out enlargement or reduction processing adopting A-VRS interpolation processing which continuously changes an interpolation operation from comparatively high sharpness operation such as cubic spline interpolation to comparatively low sharpness operation such as B spline. In this manner, the response characteristic can be changed continuously, regardless of the enlargement or reduction ratio.

Since the image information input via the network 100 from the CT system 30 or from the MRI system 20 includes not only the subject but also characters showing a photographed body portion and the name of the patient in its image, it is more useful for the first enlargement or reduction processing means 70 to adopt the A-VRS interpolation processing which is appropriate for such image information.

Figure 3B:
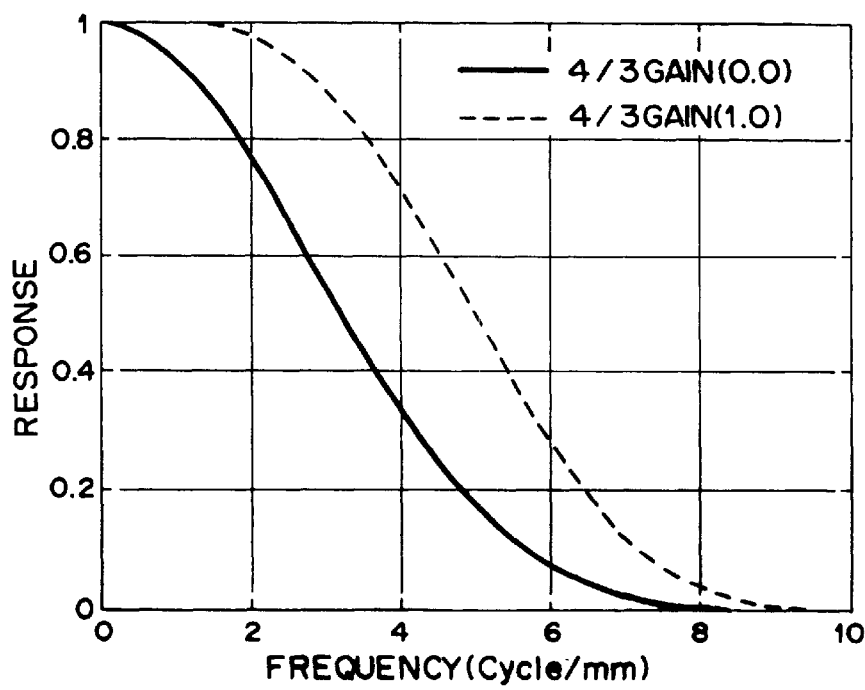

According to the A-VRS interpolation processing, as shown in FIG. 3B for example, the response characteristic for the gain of 4/3 can be changed continuously from the solid curve (response control parameter=0.0) to the dashed curve (response control parameter=1.0).

Therefore, the frequency response characteristic of the visible image output by the network printer 80 can be set freely by an operator.

For this reason, the visible images reproduced by the network printer 80 and by the CR printer 13 are visually different in terms of the response characteristic, even when the same image information (for example, image information generated by the CR system 10) is used for reproduction by both. This is not appropriate as an image information network to obtain images for diagnosis.

Therefore, the image information network system 100 of the present invention comprises, in its image processing apparatus 50, conversion means 60 for converting the characteristic of the interpolation processing by the first enlargement or reduction processing means 70 into the characteristic corresponding to that of the interpolation processing by the second enlargement or reduction processing means 12 so that a visible image reproduced by the network printer 80 visually agrees with a visible image reproduced by the CR printer 13 in terms of the enlargement or reduction ratio and the response characteristic.

As shown in detail in FIG. 2, the conversion means 60 comprises reading density and image size recognizing means 61 for recognizing a reading density and an image size from information accompanying input image information, enlargement or reduction ratio setting means 63 for enabling an operator to input a desired enlargement or reduction ratio (gain), a sharpness parameter table 64 which records sharpness parameters defining the characteristic of the interpolation processing by the first enlargement or reduction processing means 70 so that the response characteristic of the interpolation processing by the first enlargement or reduction processing means corresponds to the response characteristic of the second enlargement or reduction processing means in order to cause the response characteristic of the image information interpolated by the first enlargement or reduction processing means to almost agree with the response characteristic of image information interpolated by the second enlargement or reduction processing means in at least a frequency range lower than the Nyquist frequency, and parameter selecting means 62 for selecting a parameter from the sharpness parameter table 64, based on the reading density and the image size recognized by the reading density and image size recognizing means 61 and the gain input to the enlargement or reduction ratio setting means 63.

The first enlargement or reduction processing means 70 carries out interpolation processing and enlargement or reduction processing on image information by setting a response control parameter for A-VRS interpolation processing, based on the parameter selected by the parameter selecting means 62 of the conversion means 60 and the gain input to the enlargement or reduction ratio setting means 63.

The image processing apparatus 50 comprises a switch which is not shown, and switches on and off the necessity of the sharpness parameter conversion by the conversion means 60. When the conversion of the sharpness parameter is not necessary, (for example, in the case where image information has been input from an image generating system other than the CR system 10), no conversion on the sharpness parameter may be carried out due to the switch. This switching may be carried out automatically according to the kind of image generating system (modality) which is a source of the image information.

An operation whereby image information generated by the CR system 10 is output as a visible image on a film by the network printer 80 through the image information network 100 will be explained next.

The image information generated by the CR system 10 is sent to the network 100 upon request by the network printer 80, and then input to the image processing apparatus 50. Since the image information has been generated by the CR system 10, the sharpness parameter conversion is switched on by the switch described above.

The image information input to the image processing apparatus 50 is sent to the reading density and image size recognizing means 61 of the conversion means 60. The reading density and image size recognizing means 61 recognizes the reading density of the image information (for example, 5 lines/mm) and the image size (half sheet, for example) based on the information accompanying the input image information, and the recognized information is then input to the parameter selecting means 62.

Meanwhile, an operator inputs a desired gain (for example, 4/3) to the enlargement or reduction ratio setting means 63 of the conversion means 60, and the enlargement or reduction ratio setting means 63 inputs the specified gain to the parameter selecting means 62.

The parameter selecting means 62 selects one of the parameters from the sharpness parameter table 64, based on the reading density, the image size, and the gain having been input. The sharpness parameter to be selected by the sharpness parameter selecting means is a parameter setting a response control parameter so that the response characteristic of the image information generated through the interpolation processing using the input gain by the first enlargement or reduction processing means 70 is almost equal to the response characteristic of the image information generated through the interpolation processing using the input reading density, image size, and gain by the second enlargement or reduction processing means 12 when the same image information is used by the both processing means. In other words, the characteristic of the interpolation processing by the first enlargement or reduction processing means 70 is converted into a characteristic corresponding to that of the second enlargement or reduction processing means 12.

The parameter having been selected by the parameter selecting means 62 is input to the first enlargement or reduction processing means 70. The gain from the enlargement or reduction ratio setting means 63 and image information from the conversion means 60 are also input to the first enlargement or reduction processing means 70. The first enlargement or reduction processing means sets the response control parameter of the A-VRS interpolation processing, based on the input parameter and the gain, and carries out the A-VRS interpolation processing and the enlargement (4/3 gain) processing on the image information. The response control parameter in the above conditions is 0.53.

The image information through the interpolation and the enlargement processing is output to the network printer 80 after image processing of another kind thereon by the image processing apparatus 50, and the network printer 80 outputs a visible image represented by the input image information on a film.

Figure 4A:
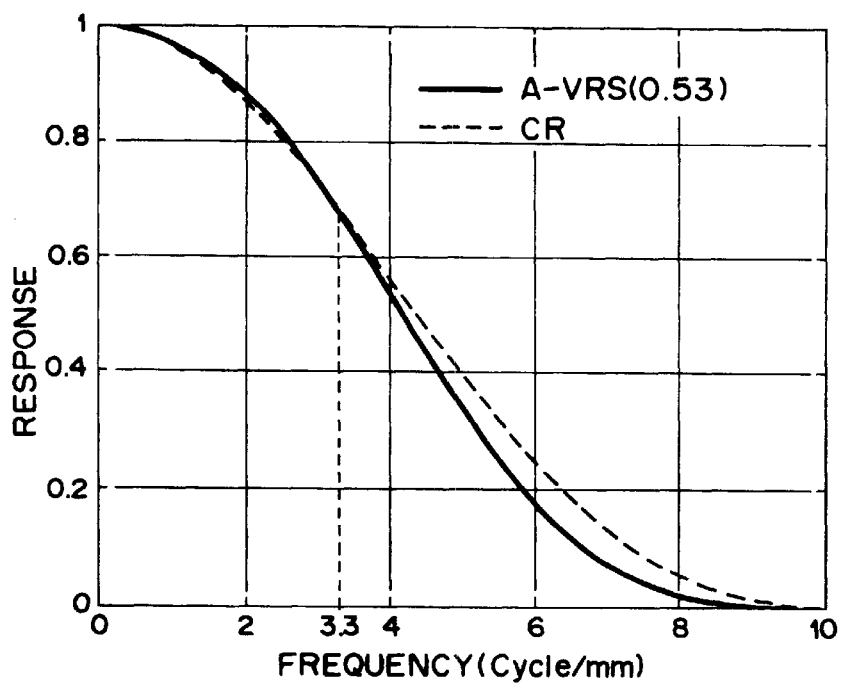
FIG. 4A is a diagram showing response characteristics of images output by the CR printer and the network printer after enlargement processing.

The visible image output on the film has a response characteristic shown by a solid curve in FIG. 4A.

Meanwhile, the response characteristic of a visible image output on a film by the CR printer 13 after spline interpolation processing using the reading density, the image size, and the gain by the second enlargement or reduction processing means 12 on the image information generated by the CR system 10 is shown by a dashed curve in FIG. 4A.

The response characteristic of the image output by the network printer 80 (solid curve) and that of the image output by the CR printer 13 (dashed curve) almost agree in a frequency range lower than 3.3 cycle/mm which is the Nyquist frequency of the image (=reading density 5×0.5× gain 4/3). Therefore, the image output by the network printer 80 has the response characteristic which is almost the same visually as the response characteristic of the image output by the CR printer 13 in the same enlargement or reduction ratio.

Figure 4B:
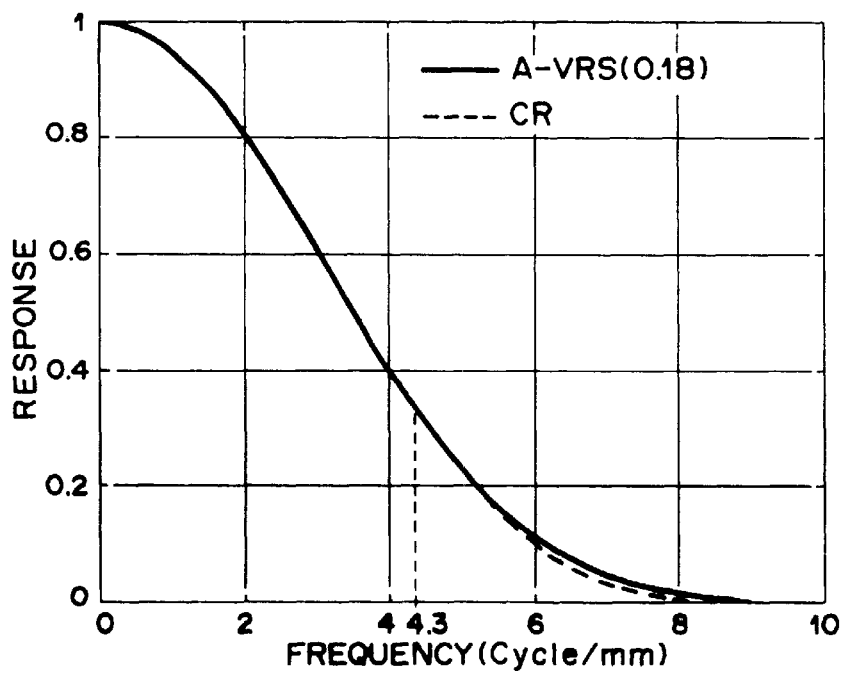
FIG. 4B is a diagram showing response characteristics of images output by the CR printer and the network printer after reduction processing.

FIG. 4B shows a response characteristic of an image (solid curve) output by the network printer 80 after reduction processing with the gain of 6/7 on image information generated by the CR system 10 with the reading density of 10 lines/mm and the image size of 1/6 sheet, and a response characteristic of an image (dashed curve) originated in the same image information and output by the CR printer 13 under the same condition. As shown by FIG. 4B, in all frequency ranges including the one lower than 4/3 cycles/mm which is the Nyquist frequency of the image (=reading density 10×0.5×gain 6/7), the response characteristics of the two almost agree. Therefore, the image output by the network printer 80 has the response characteristic which is almost the same visually as the response characteristic of the image output in the same enlargement or reduction ration by the CR printer 13. The response control parameter in the above condition is 0.18.

What is claimed is:

1. An image information network comprising first enlargement or reduction processing means for carrying out enlargement or reduction processing on an image represented by image information input thereto, by carrying out first interpolation processing which converts the image information to an image having an arbitrary enlargement or reduction ratio and an arbitrary frequency response characteristic, a first image reproducing apparatus for reproducing the image represented by the image information input thereto from the first enlargement or reduction processing means, second enlargement or reduction processing means for carrying out enlargement or reduction processing on an image represented by image information input thereto, by carrying out second interpolation processing which converts the image information into image information having an enlargement or reduction ratio and a frequency response characteristic both of which are pre-set stepwise and different from a conversion characteristic of the first interpolation processing, and a second image reproducing apparatus for reproducing the image represented by the image information input thereto from the second enlargement or reduction processing means, the image information network further comprising:

conversion means for converting the characteristic of the first interpolation processing to a characteristic corresponding to the characteristic of the second interpolation processing so that the image reproduced by the first image reproducing apparatus through the first interpolation processing almost agrees visually with the image reproduced by the second image reproducing apparatus through the second interpolation processing, in terms of the enlargement or reduction ratio and in the frequency response characteristic.

2. An image information network as defined in claim 1 wherein said conversion means is a table relating the characteristic of the first interpolation processing to that of the second interpolation processing.

3. An image information network as defined in claim 1 wherein said conversion means is a table relating a parameter defining the characteristic of the first interpolation processing to a parameter defining the characteristic of the second interpolation processing.

4. An information network according to claim 1, wherein said first interpolation processing is set continuously.

5. An image information network comprising
   a first image signal processor which converts image information to an image having an arbitrary enlargement or reduction ratio and an arbitrary frequency response characteristic according to a first interpolation process;
   a first image reproducing apparatus for reproducing the image represented by the image information input thereto from the first image signal processor;
   a second image signal processor which converts image information into image information having an enlargement or reduction ratio and a frequency characteristic response which are different from a conversion characteristic of the first interpolation process;
   a second image reproducing apparatus for reproducing the image represented by the image information input thereto from the second image processor; and
   a converter which converts the characteristic of the first interpolation process to a characteristic corresponding to the characteristic of the second interpolation process so that the image reproduced by the first image reproducing apparatus according to the first interpolation process agrees visually with the image reproduced by the second image reproducing apparatus according to the second interpolation process, based on the frequency response characteristic below a Nyquist frequency.

6. An image information network as defined in claim 5 wherein said converter comprises a table relating characteristics of the first interpolation process to the second interpolation process.

7. An image information network as defined in claim 5 wherein said converter comprises a table relating a parameter defining the characteristic of the first interpolation process to a parameter defining the characteristic of the second interpolation process.

8. An information network as defined in claim 5, wherein at least one of said first interpolation process and said second interpolation process is set continuously and the other of said first and second interpolation process is set step-wise.

9. The network of claim 5, wherein the converter converts an output of the first interpolation process to match characteristics for the second interpolation process with respect to frequency response.

10. The network of claim 1, wherein the conversion means determines conversion parameters to match an output of the first interpolation processing to the second interpolation processing in frequency response, based on a sharpness parameter of the image information.

11. The network of claim 10, wherein the sharpness parameter comprises a single level of sharpness.

12. The network of claim 9, wherein the converter determines conversion parameters to match an output of the first interpolation process to the second interpolation process in frequency response based on a sharpness parameter for the image information.

13. The network of claim 12, wherein the sharpness parameter comprises a single level of sharpness.

* * * * *